United States Patent [19]

Daniels

[11] Patent Number: 5,291,330
[45] Date of Patent: Mar. 1, 1994

[54] METHOD AND APPARATUS FOR ENHANCING IMAGE RESOLUTION BY MEANS OF A MULTIPLICITY OF PHASE OBJECTS AND AN OPTIONAL EXTERNAL RADIANT FLUX

[76] Inventor: Joseph Daniels, 339 Waterside Rd., Northport, N.Y. 11768

[21] Appl. No.: 431,549

[22] Filed: Nov. 3, 1989

[51] Int. Cl.$^5$ .................. G02B 27/50; G02B 27/22
[52] U.S. Cl. .................. 359/478; 359/558; 359/577
[58] Field of Search ........... 350/3.77, 370, 377, 350/163, 164, 162.11, 162.12; 359/1, 11, 15, 24, 558, 575, 577, 580, 583, 599, 615, 559, 564, 562, 478; 358/2, 3, 56, 88, 89, 90, 213.27, 213.28

[56] References Cited

U.S. PATENT DOCUMENTS

| | | | |
|---|---|---|---|
| H423 | 2/1988 | Mohon et al. | 359/742 |
| 3,444,316 | 5/1969 | Gerritsen | 358/90 |
| 3,473,872 | 10/1969 | Okamura | 358/88 |
| 3,548,093 | 12/1970 | Kock | 558/90 |
| 3,647,959 | 3/1972 | Schlesinger et al. | 358/90 |
| 3,716,359 | 2/1973 | Sheridon | 358/90 |
| 3,736,050 | 5/1973 | Bolum | 350/164 X |
| 3,935,351 | 1/1976 | Franz | 350/164 |
| 4,190,856 | 2/1980 | Ricks | 358/88 |
| 4,367,486 | 1/1983 | Eichenlaub | 358/88 |
| 4,490,745 | 12/1984 | Erickson et al. | 358/250 |
| 4,641,177 | 2/1987 | Ganss | 358/89 X |
| 4,757,626 | 7/1988 | Weinreich | 40/427 |
| 4,795,223 | 1/1989 | Moss | 350/3.77 |
| 4,829,365 | 5/1989 | Eichenlaub | 358/88 |
| 4,896,218 | 1/1990 | Vick | 359/601 X |

FOREIGN PATENT DOCUMENTS

1168761 4/1964 Fed. Rep. of Germany.

OTHER PUBLICATIONS

Proceedings, SPIE vol. 902, "Three-Dimensional Imaging and Remote Sensing Imaging", Jan. 14-15, 1988, W. E. Robbins.
"Picture Perfect", *Popular Science*, pp. 64-66, 111. Jun. 1988.
"Television and the Economy"; *Tech. Rev.* Apr. 1989, pp. 35-37.
"Japan Begins Broadcasts of..." The NY Times, Jun. 4, 1989.
"3-D TV", J. Free, *Popular Science*, Jun. 1988, pp. 58 ∝ 63, 110.
"Computer Graphics Let Users Get the Picture", Aug. 15, 1989; Christian Science Mon.

*Primary Examiner*—Bruce Y. Arnold
*Assistant Examiner*—David R. Parsons
*Attorney, Agent, or Firm*—Ostrolenk, Faber, Gerb & Soffen

[57] ABSTRACT

A system for enhancing the resolution of an image comprising a plurality of phase affecting light transmitting objects, preferably plates, disposed in a stack in the light path of the light energy defining an image, each plate having a thickness and being spaced a distance apart from others of the plates. Preferably, a source of radiant energy is provided for irradiating the plates and spaces between the plates in the stack and optionally the image itself to enhance resolution further by creating standing waves that interfere with the light in the light path defining the image. The plates are preferably edge illuminated, and the radiant energy may be visible light, ultraviolet energy or infrared energy, individually or intermixed. The system has application both for enhancing existing images as well as enhancing images during the image storage process.

92 Claims, 7 Drawing Sheets

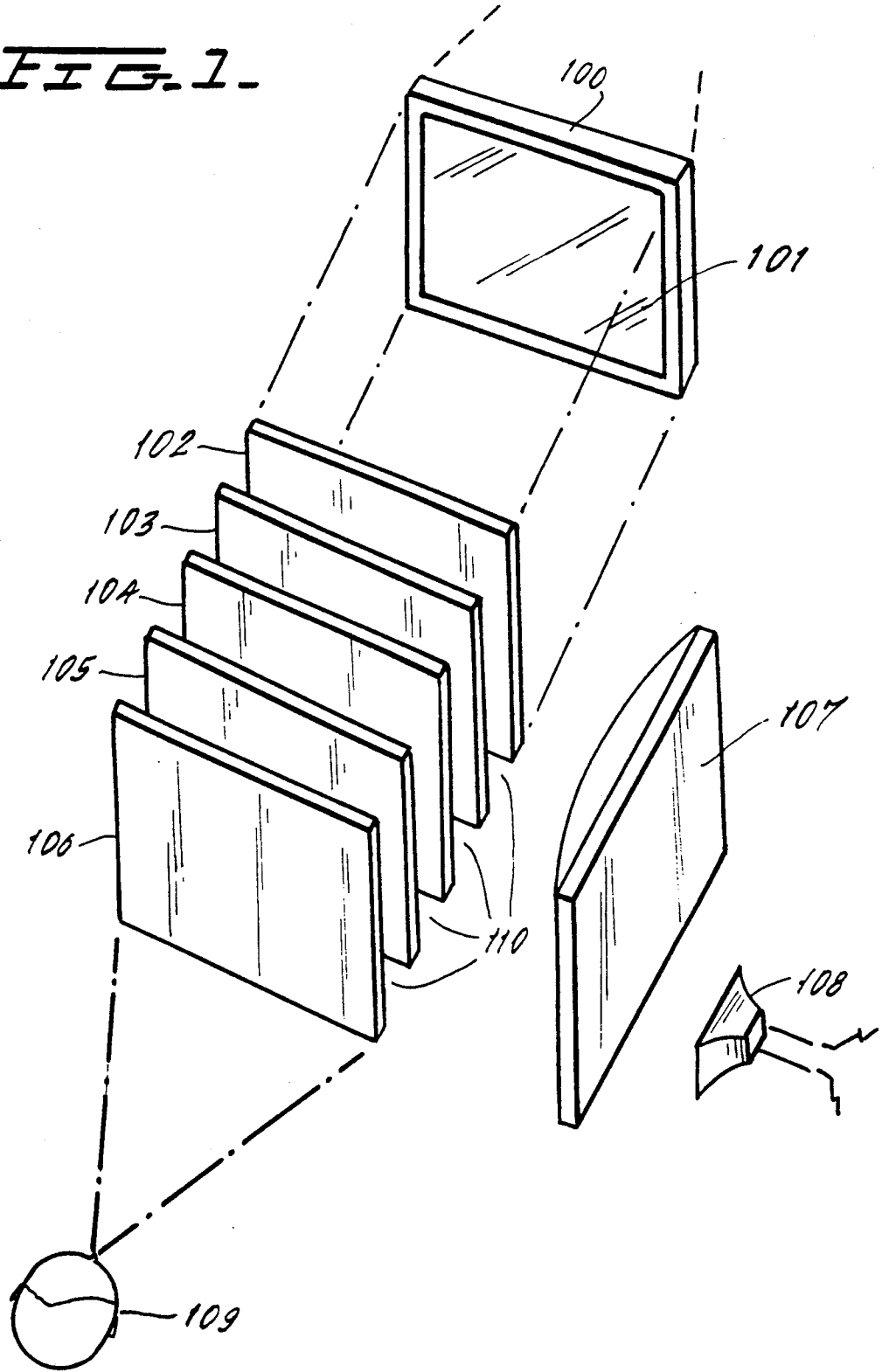

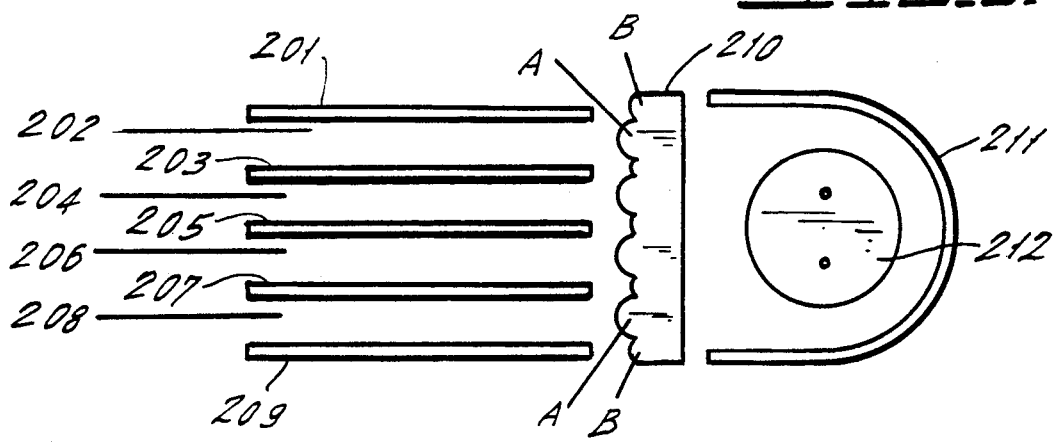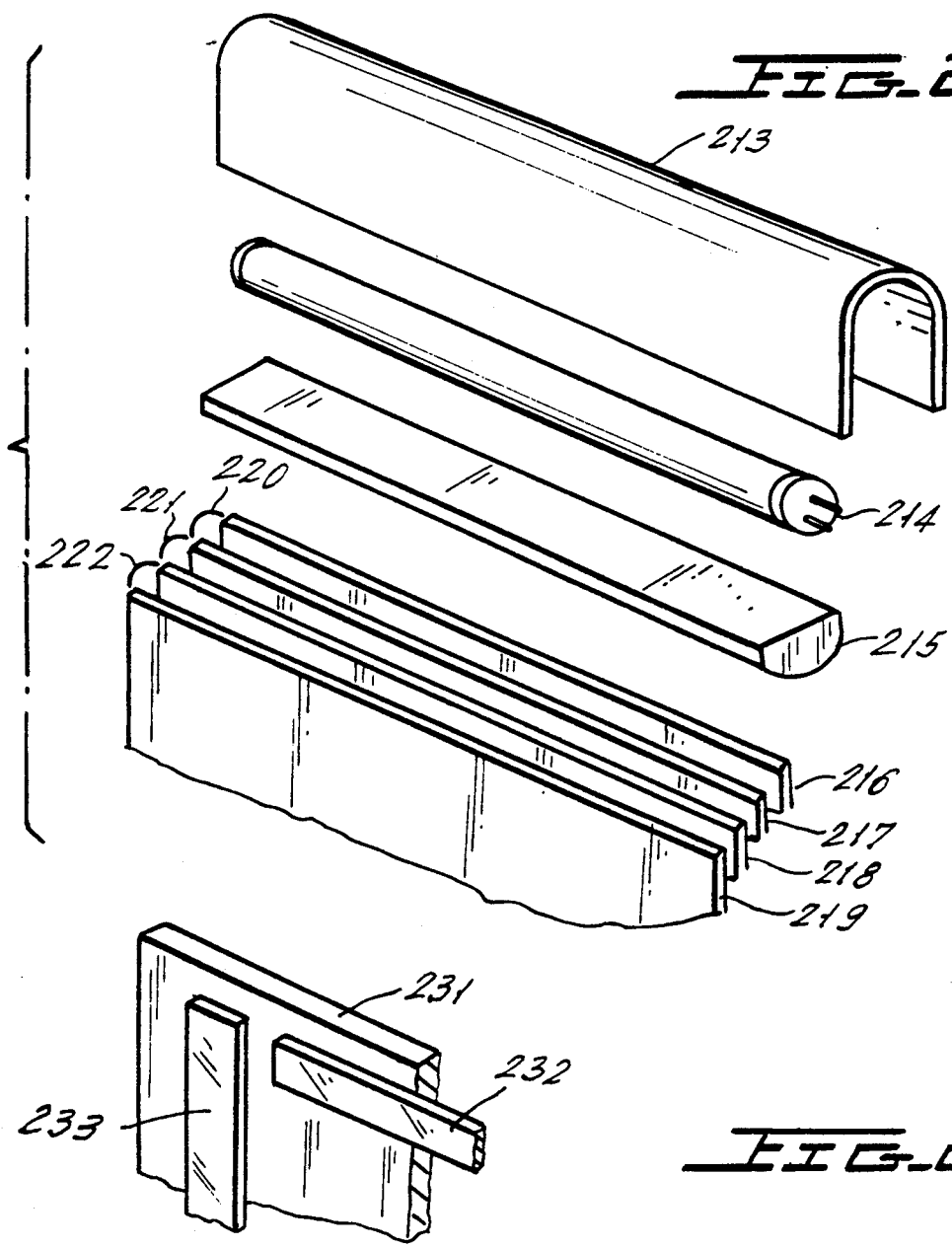

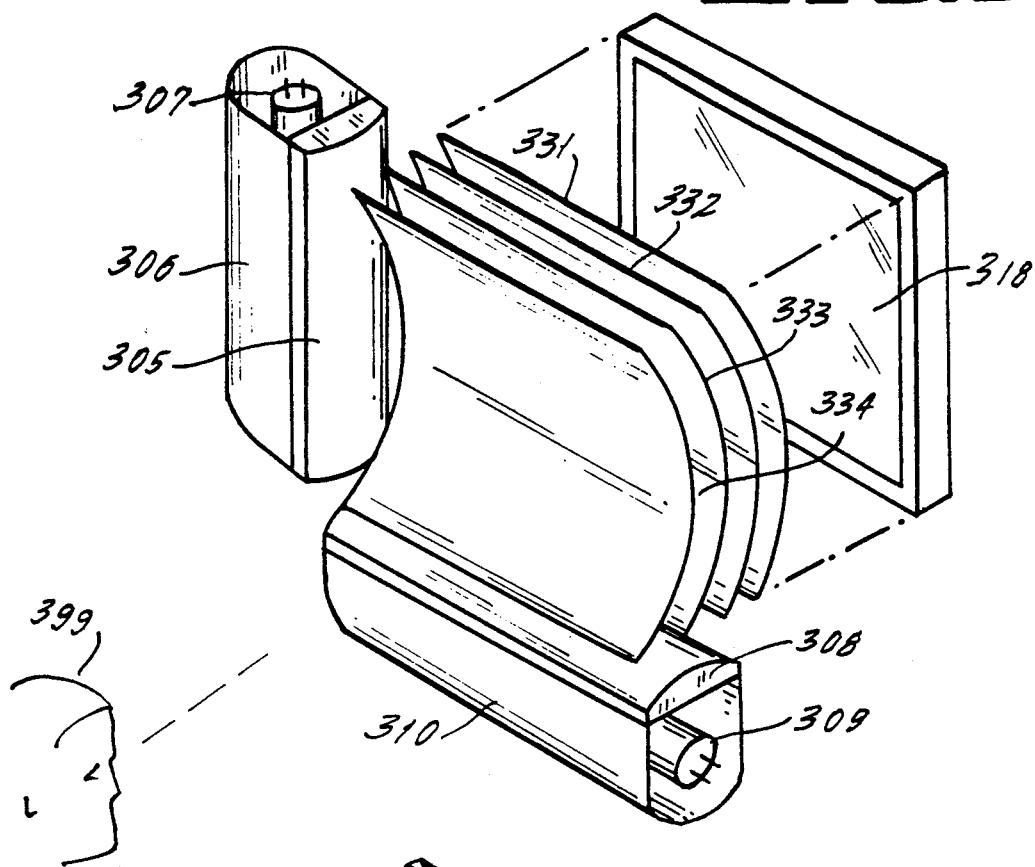
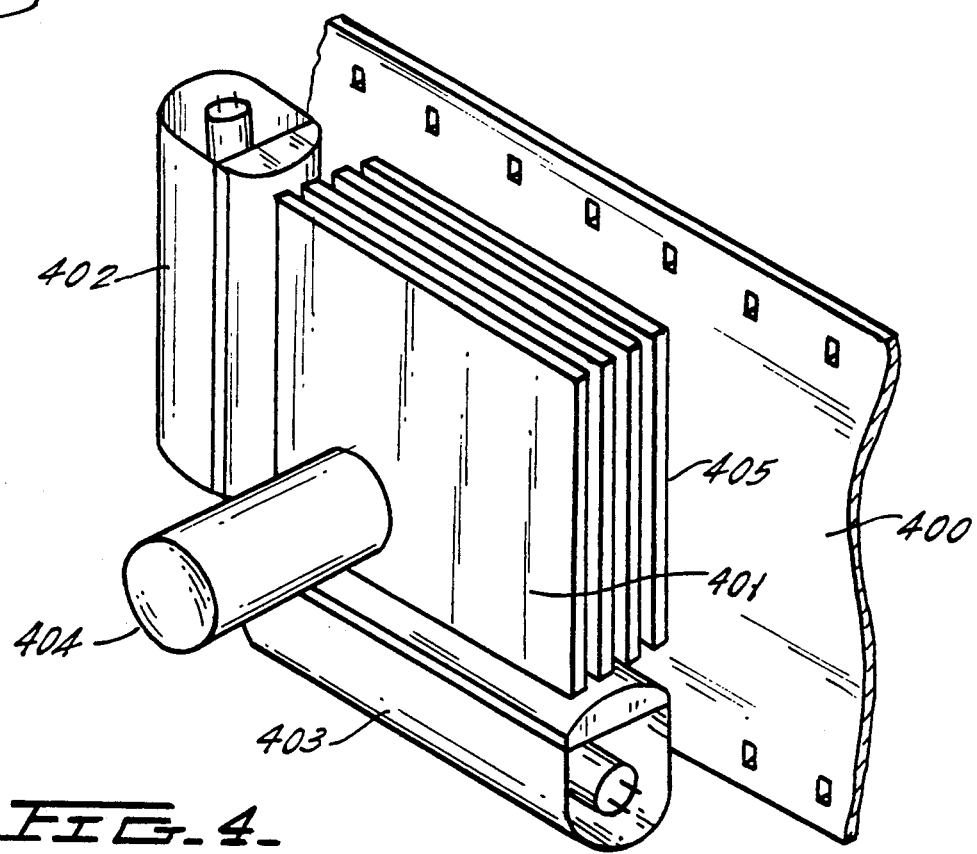

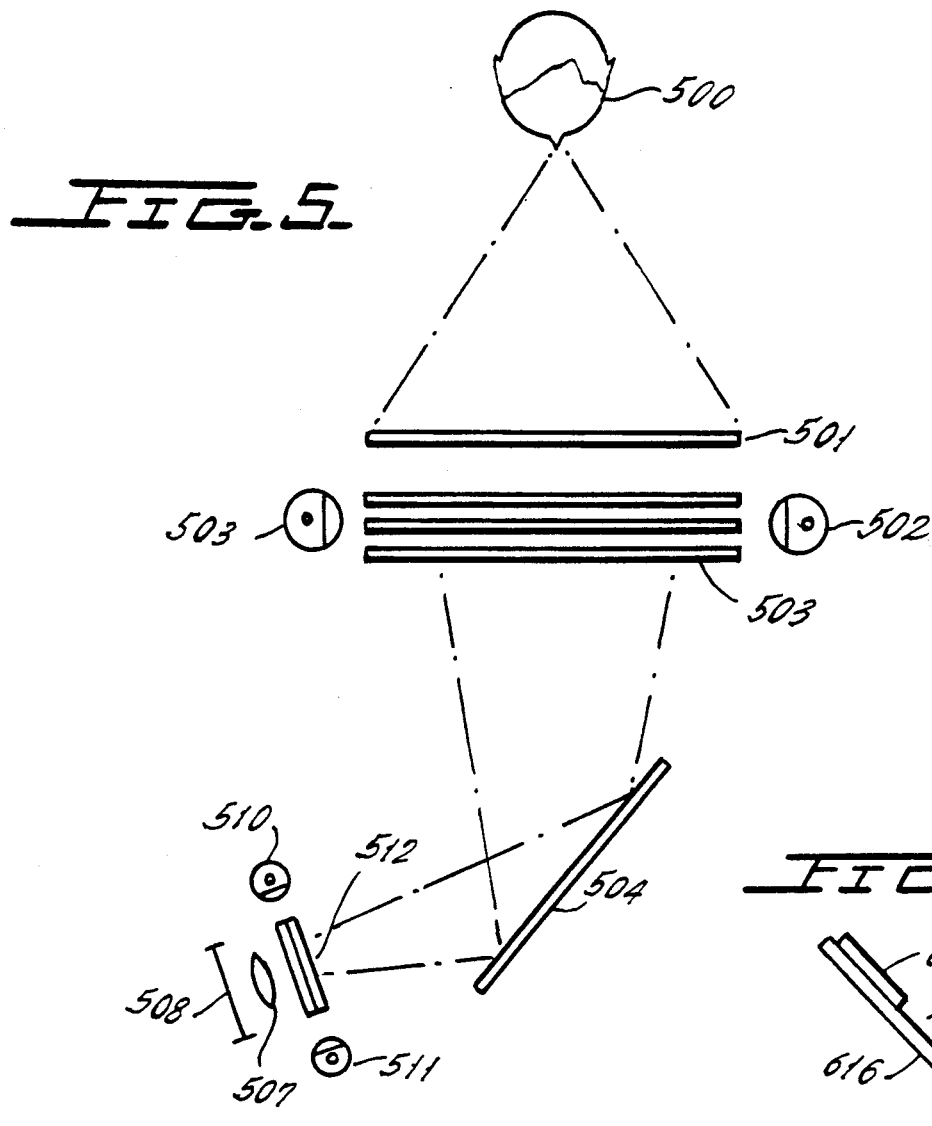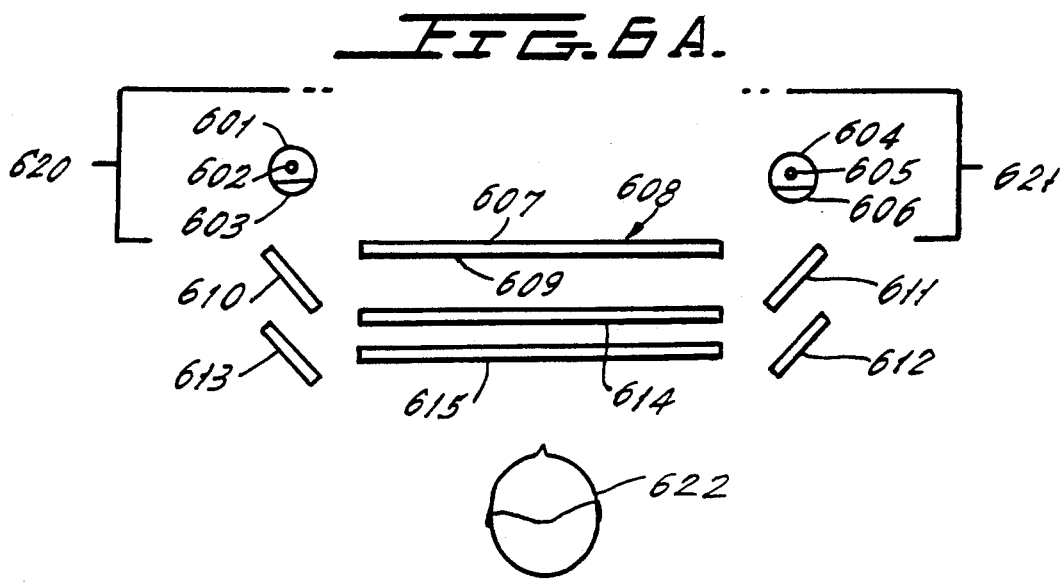

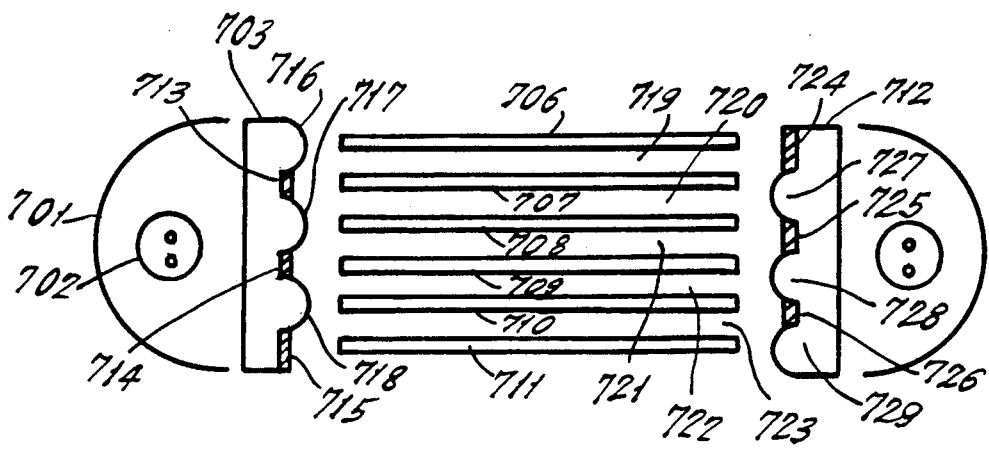
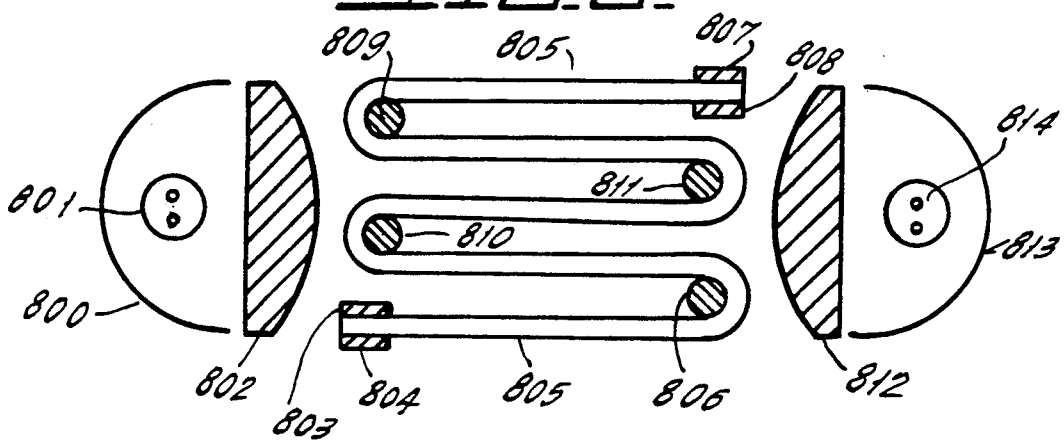
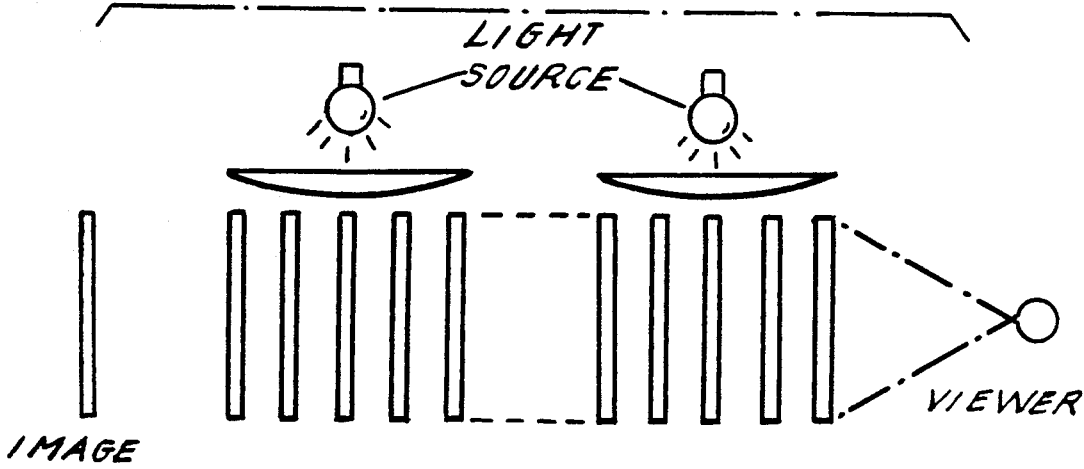

METHOD AND APPARATUS FOR ENHANCING IMAGE RESOLUTION BY MEANS OF A MULTIPLICITY OF PHASE OBJECTS AND AN OPTIONAL EXTERNAL RADIANT FLUX

BACKGROUND OF THE INVENTION

1. Field of the Invention

This invention relates to the art of enhancing image resolution and creating a sense of depth perception through spatial filtering usually carried out within the image transform regions. Some of the better known prior art technologies are the schlieren, dark ground, phase contrast and modulation contrast methods.

2. Description of the Prior Art

Image resolution enhancement methods consist of emphasizing the higher spatial frequencies of the image transform. Methods for doing this exploit qualities unique to either diffraction or interference but on occasion they are combined. As used here, diffraction is the process of limiting a single wave in any way whereas interference is the interaction of two or more waves with each other.

As Abbe has shown, all information concerning the image of an object is contained in its diffraction pattern. Light reflected from any point of an image array a(u) is a complex quantity composed of real and imaginary components, amplitudes and phases respectively. Photography fails to preserve these relationships since film responds solely to light amplitudes. Only the absolute value of each element of array a(u) would be recorded. Object reconstruction from these diffracted images is possible only when their components are real, that is, when their phase components are either zero or 180°.

A phase object is an optical element having high light transmission and which causes a relative phase retardation at various points on its surface that is proportional to its thickness variation at those points. Required thickness variations are best obtained by controlled dielectric deposition on specified areas of a plate's surface. A shell cast plastic sheet and/or window glass pane have randomly distributed thickness variations that could, at times, favor their use as phase objects. Optical flat or even window glass are good examples. In a phase object, the vectors representing the complex amplitudes of all of an object's various points are of equal length but differ in phase angles. The vector sum of these vectors is the single vector that represents the zero order of the diffraction pattern.

Spatial image enhancement by the dark ground and schlieren methods suppress the zero order and its vector is therefore greatly reduced or eliminated while the image's new vectors become of unequal length and therefore represent an increase in contrast. There are a variety of ways of accomplishing this. Mechanical means such as discs so placed as to block out the central portions of an image is the technique of dark ground enhancement with its disc located on the object side of the lens. In the schlieren method, a knife edge at the image focal plane literally cuts its diffraction image, and thereby its transform, in half. In the phase and modulation contrast methods, the zero order vector is shifted by means of a phase object upon whose surface the location and thickness of a dielectric is varied.

The joint use of diffraction and interference together in the photographed image is of great theoretical and practical significance. French physicist Lippman used this to produce dyeless color images from black and white positives. He coated the rear surface of a photo plate with mercury so that the wave from any given point of the transform is reflected back through the film's emulsion and thereby interferes with its incoming wave. This results in standing waves throughout the emulsion whose wavelength at any point is that of the incoming wave at that point. When the developed positive is viewed at an angle under white light, the embedded standing waves function as spectral diffraction gratings, and extract from the white light, a color that corresponds exactly to that at the same point on the object. The result is a picture in exquisite natural color.

A hologram is the image captured on film of an interference created diffraction pattern. Light from a coherent source is divided into two paths. One contains the plane (reference) wave, while the other illuminates the object. The object's reflecting points cause their reflected (object) waves to be spherical. An intersecting plane (film) placed at a point where the spherical and plane waves are interfering, would have on its surface, a series of irregularly spaced concentric rings looking somewhat like a zone plate. The ring spacings correspond to the phase differences between the zero and first orders of the transform. When viewed under its reference light, the film's rings cause its diffraction and result in object reconstruction.

SUMMARY OF THE INVENTION

It is a principal object of the present invention to enhance the resolution of conventional two dimensional images such as still photographs, television images and motion pictures.

It is a further object of this invention to provide the aforesaid enhancement to the images produced by liquid crystal display (LCD) devices while providing as well the front and rear surface illumination usually required by such displays.

Another object of this invention is to provide these image enhancements through economical yet highly effective means.

It is furthermore an object of the present invention to enhance image resolution both during the display of an image and during image storage, e.g., during photographic film exposure.

It is an additional object of this invention to provide through resolution enhancement an added sense of spatial depths to the aforesaid two dimensional images, i.e., what is often referred to as three-dimensional imaging.

The process of sensing an image's spatial depth requires comment. The illusion of space is a cerebral experience presently not fully understood and therefore not possible to quantify at this time. Though all tests of spatial depth remain subjective, a currently used qualitative test is that of parallax. This speaks to the change in the apparent position of an object or objects within an image, in accordance with a change in the viewer's position. Such a test is applicable only to multi-lens or holographic generated images. Although enhanced depth illusion is possible from a single image of high resolution and contrast, it will fail a parallax test. Multi-lens images and holograms are presently severely limited by their need for dedicated viewing means, such as special eye glasses or optics and/or light sources etc. These limitations make desirable effective and economical methods of producing spatial enhancement in current conventional photographic and television images.

All photographic images may be considered as two dimensional screens by virtue of discontinuities inherent to the film's granular structure. This is furthered by both the grain of the photo print as well as its surface roughness. Many images have purposefully ordered discontinuities such as those that are halftoned (screened) or organized as image pixels as in the raster lines of television and computer images. Each element of an image so constructed produces a spherical wave front and their totality is an image in the first state of diffraction described by Abbe. A quantitative way of treating this is as a Fraunhofer boundary value problem in which every two dimensional screen has a diffraction pattern with spherical wavefronts and this forms a basis for this invention.

This invention uses phase objects to achieve image resolution enhancement. The phase retardation caused by the phase objects produces an enhancement of the higher spatial frequencies in a manner analogous to an audio high pass filter whose frequency variable input is a voltage applied to a resistor and inductor in series, and whose output is across the inductor. Phase objects more efficiently retard phase in a plane wave than in a spherical one. Increasing the image to subject distance, however, offers means of reducing this efficiency difference. Since the radius of the spherical wave front has increased, the length of any given arc will tend to approach that of its subtending chord. This phase object enhancement of a spherical wave diffracted image is proportional to its distance from its origin. Improved enhancement by increased separation distance is limited by light losses as well as image distortion possibly caused by thickness variations.

A phase stack is a collection of phase objects arranged in tandem so that light passing through one passes through all. Each plate has its linear dimensions sufficient to enclose the image being processed. Plates are separated by an amount at least equal to or greater than several wavelengths of the longest wave in the transmitted light's spectra. They may be made solely of a particular transparent material such as glass or plastic plates or of such materials intermixed. The locations of the thickness variations on the plate's surface may be random in their distribution. Image points, however, are position invariant in the image planes of all plates. Enhancement is thus exponentially proportional to the power of the number of plates. When the thickness variations distribution is random, distortion increases exponentially only as the root of that number.

Though the phase stack as an image enhancement tool is a teaching of this invention, a further teaching is that the stack's enhancing efficiency may be greatly increased by irradiating it, so to speak, by an external steady state radiant flux whose average intensity is a magnitude greater than that of the image over an equal area. This external flux may be restricted to the area occupied by the stack and floods the thickness of each plate as well as the space that separates each plate from the other, or, also used to flood either front or rear surfaces (or both) of an LCD image generator.

In manners akin to both the Lippman and holographic methods previously discussed, interference occurs between the image's waves and those from the external flux. The steady state nature of the external flux allows standing waves to be established throughout the phase stack area. Through interference with the phase retarded image waves of the stack, the higher spatial frequencies are increased. This is most effective when the power spectra of the radiant flux includes and also has appreciable energy at wavelengths beyond both ends of the power spectrum of the image, such as ultraviolet through infrared. Ultraviolet flux works well as the interplate space radiant flux. However, not all otherwise useable materials provide ultraviolet light a good transmission through their thickness. Although the full spectrum source specified above is the most efficient, incandescent, fluorescent, ultraviolet and infrared sources may each be used as a sole flux source, though efficiency may be lower than for an intermixed source.

Phase stacks with or without their attendant light flux, may be placed at almost any point in the image source to viewer path. They need not be in a single unified assembly, and may be distributed in series with the viewing path as separate stand-along assemblies, each of which could differ in the number of its plates, and be constructed with or without its own radiant flux source. Phase stacks work well with all image generating displays, such as cathode ray tubes (CRTs), LCDs, and gas plasma displays, ect., in color or monochrome. The front covering of such display devices could in themselves be made into phase plates by transmitting a radiant flux through their thickness. The flux applied to the phase stack may also be used as the required light required by LCDs for their front and/or imaging surfaces. Simple and inexpensive optical means could readily accomplish this flux sharing. Indeed, the varied optical elements used in projection systems may also be used to perform the phase object functions by the same radiant flux technology. The projection screen and/or elements of the projection lens itself may be caused to function as phase plates when a light flux is transmitted through their cross sections.

Relative phase retardation of the elements comprising a surface presented image, occurs due to the deviations in that surface from that of an ideal and uniform plane. Any given picture element may be phase displaced with respect to its neighbors solely as a function of those minute variations in thickness that is characteristic of almost every image surface. This means that the teaching of this invention with respect to image enhancement through interference from an external source of radiant flux and phase retarded image elements, should also occur directly at the image surface, as indeed it does.

This may readily be seen by taking a quality printed image of a three dimensional object or scene, and viewing it under an extremely strong light, such as only inches or less away from a desk lamp. (It may be necessary to slightly tilt the image to avoid glare). Upon viewing, the enhanced quality of both sharpness and spatial depth of the image will be immediately apparent. This effect can be used to add to those enhancements produced by the phase object arrays as previously discussed. A portion of the array's radiant flux may be directed to the image surface, and/or an additional and separate flux source may be added for image surface irradiation.

BRIEF DESCRIPTION OF THE DRAWINGS

These and other objects and many of the other attendant advantages of this invention will be readily appreciated as the same become better understood by reference to the following detailed description when considered in connection with the accompanying drawings in which:

FIG. 1 is a perspective exploded view of the invention when used to process an existent image;

FIGS. 2A and 2B show two means for interfacing radiant light flux to the plates and interspaces of the phase arrays in, respectively, a side view and an exploded perspective view;

FIG. 2C shows means for reducing the effects of surface defects such as dirt and scratches on a phase plate surface;

FIG. 3C shows an additional flux source used to irradiate the image surface, whereas

FIG. 3E illustrates the basic embodiments of phase sources shown herein except that the phase array plates are not flat planes;

FIG. 4 shows the application of a phase array and radiant flux sources to a camera in a perspective view;

FIG. 5 illustrates the application of radiant flux sources and phase arrays in an image projection system in a plan schematic view;

FIGS. 6A and 6B illustrate, in plan schematic views, the illumination of the front and/or rear panels of an LCD device through the sharing of the radiant flux of its associated phase stack;

FIG. 7 shows an embodiment of the invention that enables the use of special radiant flux sources and plate materials;

FIG. 8 shows an alternative embodiment of the invention using plates made of a plurality of sections of a single substantially transparent material; and FIG. 9 shows an embodiment of the invention having plural stacks of phase object plates.

DESCRIPTION OF PREFERRED EMBODIMENTS

Figure 3A:
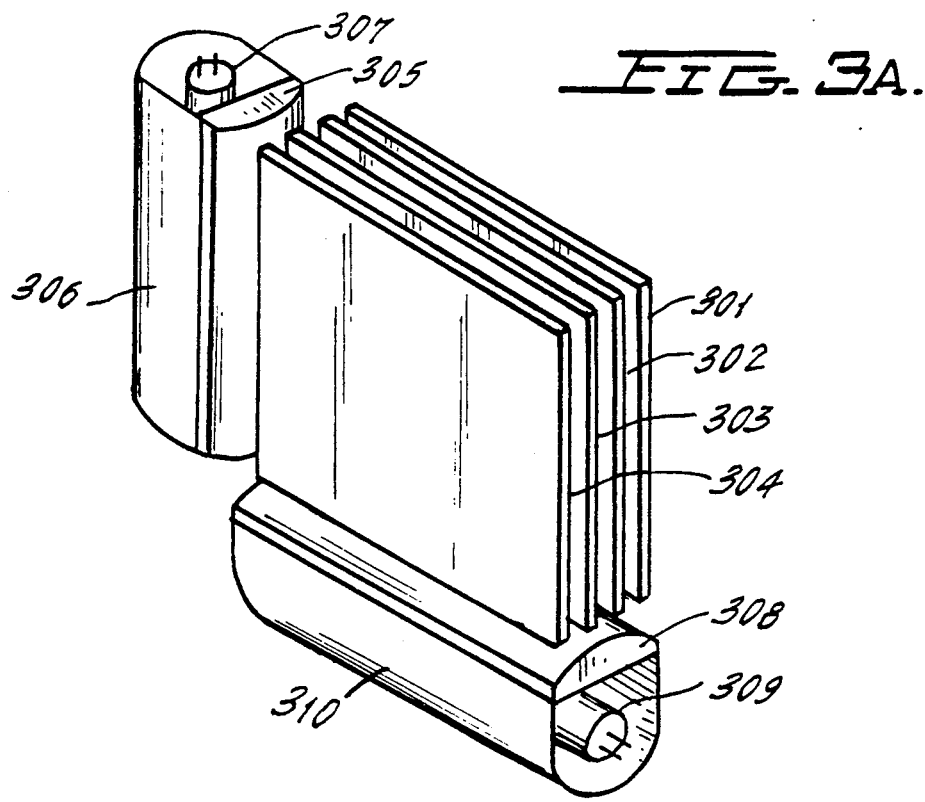
FIGS. 3A and 3B show two embodiments, respectively, in perspective views, in which a multiplicity of radiant flux sources may be positioned to service a phase array.

With reference now to the drawings, in FIG. 1 an image generator such as a cathode ray tube (CRT), LCD or similar device 100, produces an image 101 at its surface. Phase object plates 102 through 106 inclusive form a phase array. The phase array is irradiated through the thickness of each plate, all plate surfaces and interspaces 110, preferably by a radiant flux from source 108 whose output is concentrated by condenser lens 107. The image 101 as processed by the aforesaid array is seen by the viewer 109.

Plates 102 through 106 are made of high transparency materials such as glass or plastic. A plate made of either of these suffers an intensity loss due to reflection at each of its surfaces and additional losses through polarization. The total loss is about 6 percent per surface consisting of a reflection loss of about 4 percent plus a 2 percent polarization loss. This is usually stated as an efficiency percentage per plate (both surfaces), equal here to 100-12 or 88 percent. This may be dramatically reduced by coating each plate with a multi-layered dielectric to assure uniform reflected wave absorption over the passband. This or additional dielectric coatings may be so deposited as to implement or provide the thickness variations required in a phase object of specific design.

Optical quality is a prime consideration in the choice of plate material. The thickness variations required to make a functional phase object should never be so gross as to cause observable image distortion. Thickness variation need only be in the order of wavelengths, a condition readily achieved through controlled depositions of dielectric materials. The initial optical quality required of each plate forming a multiple plate phase array is readily met by the better grade of cell cast acrylic materials.

Acrylic prices rise rapidly for sheets of a nominal thickness less than 0.06 inches. A stack of 10 plates made from 0.06" sheets and with an 0.03" inter plate spacing has a total thickness of 0.87 inches. This is very useful thickness since it approximates the diameter of a whole family of fluorescent lamps which may be placed along any one or all of the stack's linear dimensions, either singly or in parallel geometries. Fluorescent lamps offer a variety of spectral outputs, linear geometry, high efficiency, cool operation, and long life. Coupled to their low cost, these features makes them the preferable radiant flux source. Current limiting and automatic starting are readily available from inexpensive transistorized inverters operating from low voltage supplies.

Great care must be taken when assembling a multi-plate array. The surface of each plate must be as dust and dirt free as possible. Thin films of oils, normally invisible on a single sheet, can become annoying reflectors in multi-sheet assemblies. It is important with very thin sheets to keep the sheets' surfaces from clinging to one another and thus possibly producing Newton rings. Preferably, the plates are disposed at least one wavelength apart.

Phase arrays may be cascaded with each set of stacks having their own radiant flux sources and separated from each other by distances considerably greater than their usual plate interspace 110. Image enhancement exceeds that of a single stack having plates and flux equal to the total of the separate stacks, but they cause an increase of internal system reflections which may tend to limit their use.

In summary then, acrylic sheets of 0.06 to 0.125 inches thickness, edge illuminated by linear arrays of fluorescent type lamps, and spaced apart a distance of at least one, and preferably several wavelengths, are the preferred embodiment. Inexpensive systems can be formed using polycarbonate sheets as thin as 0.005 inches, provided they are treated to avoid electrostatic attraction so as not to cling together and form Newton rings.

Since a single uncoated plate has an efficiency of approximately 88 percent, the net efficiency of a phase stack made of 9 such plates is found by raising 0.88 to the 9th power which results in a 32 percent efficiency. Antireflection coatings can reduce a single plate's total loss to less than 1 percent. Thus a phase stack made of 9 coated plates would have a net efficiency of approximately 91 percent, (0.99 raised to the 9th power).

Information derived from a consensus of viewers as to the overall enhancement, (sharpness and spatial depth), provided by given array, can be design value. It is possible to reduce this to a variable QG, that is, a (Q)ualitative (G)uide to phase stack performance.

Enhancement is proportional to the number of plates and their efficiency in a stack, as well as to the array to image separation distance.

Fourteen (of fifteen) viewers found an array made of 7 plates, as discussed above, produced a "worthwhile enhancement" when the stack to television image separation K was 16 inches. (K=16).

Its AE, (A)rray (E)fficiency, will be (0.88 to the 7th power)×100 or 41 percent.

The product K and AE is VN, the (V)iewing (N)umber. VN is therefore 41×16 or 656.

Each plate has an (E)nhancement (C)onstant, an EC, that expresses this function. Here EC is identical for each plate and is an arbitrary constant equal to 2.

(O)verall (E)nhancement, OE, is found by raising EC to the number of plates. OE thus equals 2 to the 7th power this example, which is 128.

The qualitative guide number QG can now be derived. It is the product of VN times OE which is 655×128. Thus QG equals 83698, best rounded to 84000.

Consider now an identical stack made instead of 7 anti-reflection coated plates. Here the single plate efficiency is 99 percent resulting in an overall AE of 93 percent.

It is desired to operate this stack at a distance of 3 inches from the image instead of the previous 16. Thus K will now be 3, (instead of 16).

This stack will therefore have a VN equal to K×AE or 3×93 which equals 279.

With the same OE of 128 as the previous stack, QG is 279×128 or 35584, rounded to 36000.

If a QG of 84000 is desired from this array, it must be increased by adding additional plates to the stack. The ratio of inadequacy is also the ratio of the QGs, 84000/36000 or 2.33. This is the amount by which OE must be increased.

The new OE therefore needs to be 128×2.33 or 300. Adding one plate to the stack would make OE equal to 2 to the 8th power or 256. This is really quite acceptable since 2 to the 9th would give an OE of 512, a considerable overkill. The performance of an eight plate anti-reflection coated stack compared to the seven plate untreated stack is reduced by a factor of 256/300, or is within 85 percent of the previous performance (although having a brighter image than the stack not treated to reduce reflection).

FIGS. 2A and 2B show methods for efficiently coupling the external radiant flux to the stack structure. With reference to FIG. 2A, there are two distinct areas to be so serviced. First is the thickness of each plate and their surfaces as shown by 201, 203, 205, 207, and 209 respectively. The B elements of an extruded cylindrical lens 210 directs the flux from radiant source 212 into the aforesaid areas. The second areas are the interspace that exist between adjacent plates as identified by 202, 204, 206, and 208 respectively. These are serviced by the A elements of lens 210. The major disadvantage of this method is that alignment between the lens and their corresponding stack element (stack or interspace) is critical, particularly if the effective aperture numbers of the lens elements are held small.

An exploded view of a typical modular flux assembly is shown in FIG. 2B. Reflector 213 may be made of either metal or of a reflective coated plastic and be so dimensioned as to hold half-cylindrical lens 215 at its outer edges. This lens could alternatively be of the distributed design discussed above with reference to FIG. 2A. The radiant flux source 212 is mounted between elements 213 and 215. The module could then be either a part of, or mounted adjacent to, the plates of an array in such a manner as to irradiate plates 216, 217, 218 and 219 as well as their respective interspaces, 220, 221, and 222.

FIG. 2C shows the use of opaque strips 232 and 233 to form a barrier that reduces the tendency of radiant flux to emphasize surface scratches and dust on phase array plate 231. These strips can be a routine part of the manufacture of these plates, and placed on all four edges of each side, (eight per plate) They may be up to an inch wide and made of thin adhesive plastic (a mil or so thick), and/or painted.

Figure 3B:
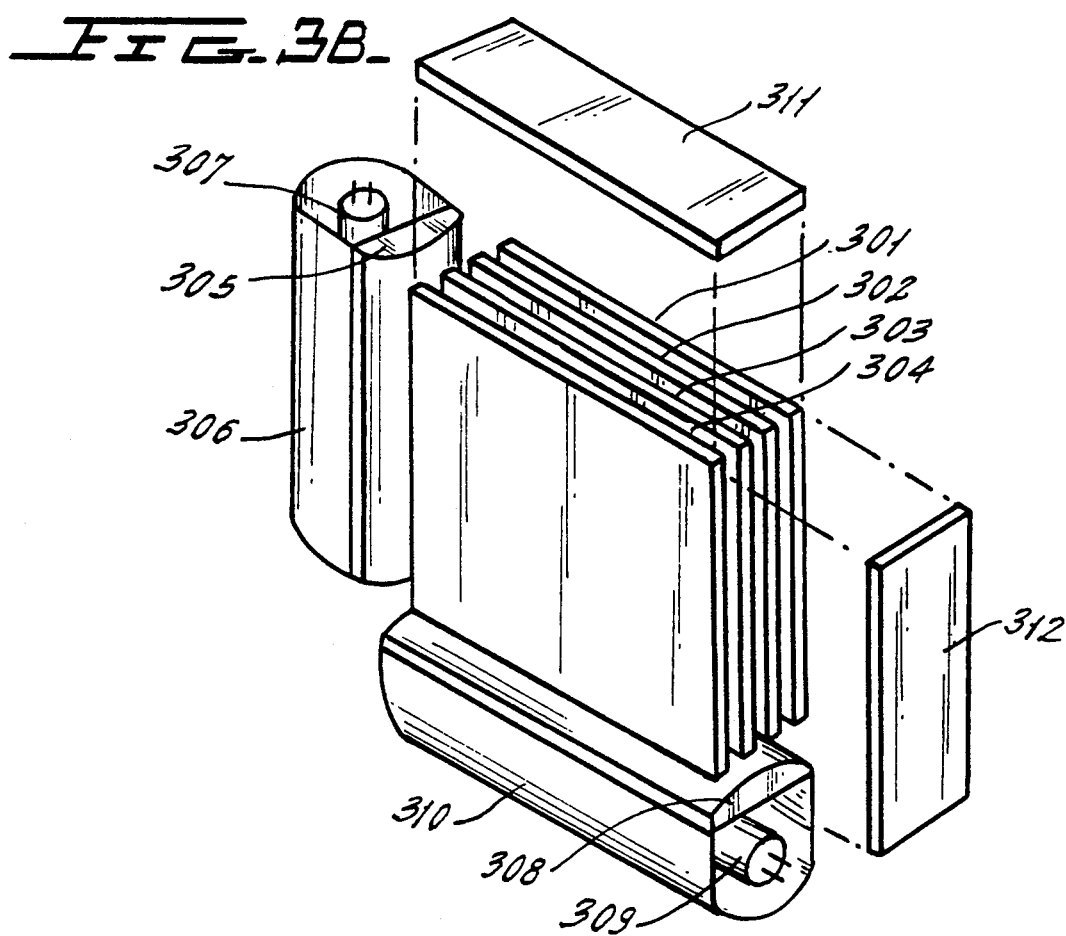

FIGS. 3A and 3B illustrate one placement of two modular flux modules about a phase array consisting of plates 301, 302, 303, and 304 respectively. One module consists of radiant source 307, reflector 306 and lens 305 and the other of source 309, reflector 310 and lens 308. An additional module or modules could be placed along the remaining edges of the array. The front surfaced 100 percent reflective mirrors 311 and 312 shown in the embodiment of FIG. 3B may be disposed on the sides of the array opposite the flux sources so as to reflect light back into the stack and thus improve overall enhancement. When greater coverage or intensity (or both) is required, flux modules may be operated along side of one another, or mounted end to end and in further combinations of possible mounting geometries.

Figure 3C:
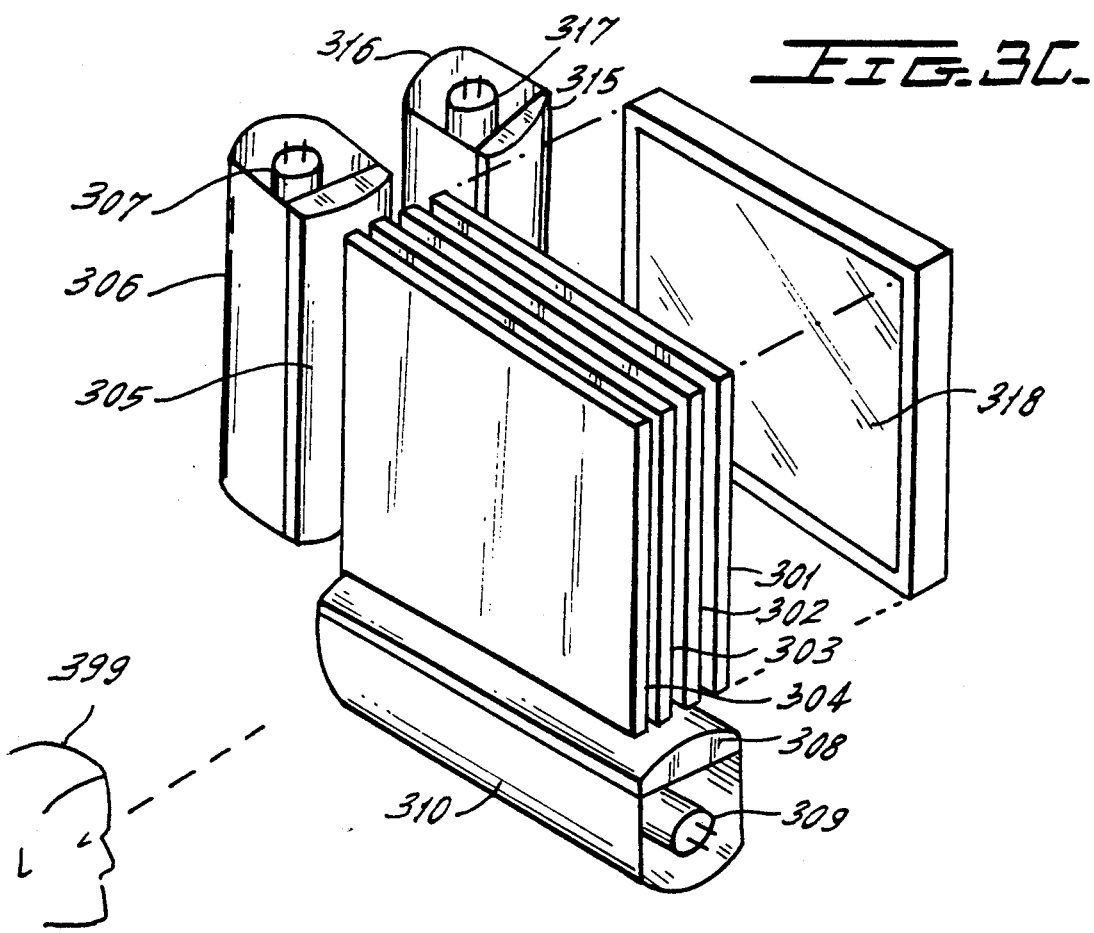

In FIG. 3C, the embodiments of both FIGS. 3A and 3B are supplemented by source 317 which in conjunction with its reflector 316 and lens 315, irradiate the image surface 318. This flux enhances the image and could serve as well in the case of an LCD display to supply front illumination. Viewer 399 serves to identify the output side of the system.

Figure 3D:
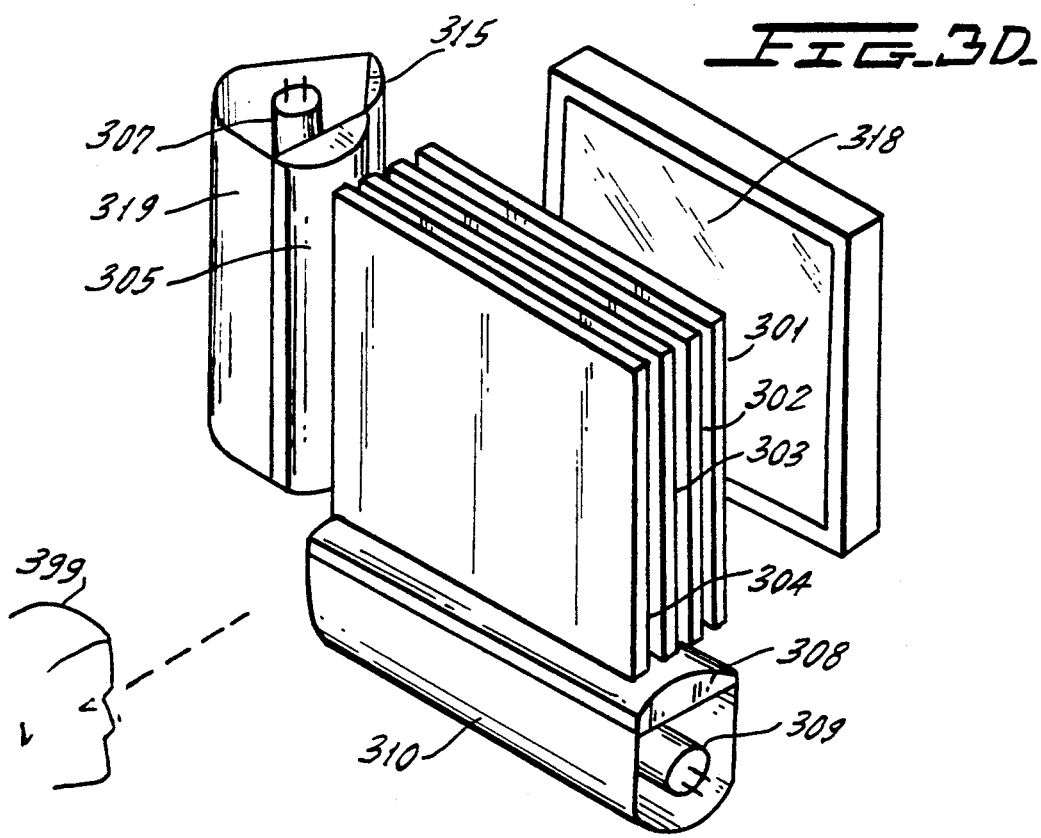
FIG. 3D shows means for irradiating the image surface by sharing the phase array flux.

FIG. 3D shows the same function of FIG. 3C except that lens source 307 is also used to illuminate image system 318 by means of lens 315. Reflector 319 is used to direct the flux from 397 through lens 305 and 315.

FIG. 3E shows the phase plates 301, 302 and 303 common to FIGS. 3A, 3B, 3C and 3D, respectively, as curved surfaces 331, 332 and 333, respectively. Such surfaces produce enhancement effects similar to their planar counterparts and may optionally be constructed as a lens by having their opposite sides made of nonconcentric cylindrical sections. When constructed as a lens, the concave surfaces would in most cases face the image surface.

Image enhancement by phase array technology need not be limited to existent images since it may be applied during the image storage process as well. FIG. 4 shows its use in a camera. Lens 404 focuses the image on to its storage plane 400, shown here as photographic film but which could alternatively be a television iconoscope screen or similar light -to-electrical signal translating device. Modular radiant flux arrays 402 and 403 irradiate the array bounded by plates 401 and 405 respectively. If the flux source is essentially an ultra violet radiator, its radiation can be efficiently confined to the stack area by suitable dielectric coating of the plates 401 and 405, respectively, so as to make them absorbers of the radiant spectra.

As previously mentioned, the phase array methods of this invention may also be applied to projection image systems such as those used in television, movies and still slides. In FIG. 5, image 508 is an illuminated image such as a television picture screen or a rear illuminated slide or movie frame, or even a front illuminated photograph. Projection lens 507 brings the image to focus on screen 501 and it is seen by the viewer 500. Mirror 504 illustrates the use of an optional device that may provide the system with a more favorable geometry. Phase array assembly 512 serviced by flux generators 510 and 511, may be placed as shown between lens 507 and mirror 504. Another array consisting of stack 509 and flux sources 502 and 503 may be placed between mirror 504 and screen 501. It should be clearly understood that the placement of the arrays as so described is a designer's choice and that the arrays may also be used in separated, joined and/or in cascaded configurations.

FIG. 6A shows how the radiant flux sources can be utilized in an LCD device for both enhancing image resolution and for providing the illumination required for viewing such displays. FIG. 6A shows a radiant flux assembly 620, made up of reflector 601, source 602 and condenser lens 603. Similarly, radiant flux assembly 621 consists of source 605, reflector 604 and lens 606. The output of source 620 feeds mirrors 610 and 613 respectively. The output of source 621 feeds mirrors 611 and 612 respectively. The mirrors 610 and 611 are shown in greater detail in FIG. 6B as mirror 616 which has two separated dielectric depositions 617 and 618 respectively. These coatings are designed to divert partially the light passing through them. The degree of front and back surface illumination of LCD device 608 may thereby be controlled. If, by way of example, rear illumination to surface 607 was required to be two times greater than that placed on surface 609, the reflectance of 617 would be made twice as great as that of partially reflecting surface 618. The uncoated surface section 619 need only be as wide as the LCD assembly 608 is thick in order to provide separate illumination control of surfaces 607 and 609 by the partially reflective coatings on mirrors 610 and 611, respectively. Mirrors 612 and 613 are fully reflective front surfaced coated so that all of their output irradiates the phase stack consisting of phase plates 614 and 615, for example. The viewer 622 is located as shown.

FIG. 7 shows in a plan view, a means for efficiently intermixing radiant flux sources of different radiating spectrums in a single phase array. Here radiant flux source 702 differs in spectral output from source 705. The optical system for source 702 consists of reflector 701 and lens assembly 703. Element 703 is an extruded transparent plastic part that contains half-cylindrical lenses 716, 717, and 718 as well as front mirrored surfaces, 713, 714 and 715. Lens 716 directs flux from source 702 to plate 706 and its adjacent space 719. The material of which plate 706 is made, has its most efficient conduction over the same spectral range as the output source 702. This also applies to plates 708 and 710. Front surface mirrors on extruded lens 712 on the opposite side are used to reflect the flux from source 702. Mirror 724 directs flux to space 719, mirror 725 directs flux to space 721 and mirror 726 directs flux to space 723.

The optical system for source 705 consists of reflector 704 and lens assembly 712. Element 712 is an extruded transparent plastic part that contains cylindrical lenses 727, 728, and 729 as well as front mirrored surfaces, 724, 725 and 726. Lens 727 directs flux from source 705 to plate 707 and its adjacent space 720. The material of which plate 707 is made, has its most efficient conduction over the same spectral range as the output of source 705. This also applies to plates 709 and 711. Front surface mirrors on extruded part 703 are used to reflect the flux from source 705. Thus space 720 is addressed by 713, 722 by 714 and the space in front of plate 711 by mirror 715.

FIG. 8 shows in a plan view, a folded and continuous sheet or film of transparent plastic 809 that forms a phase array by being wound about posts 809, 811, 810 and 806 respectively. It is clamped at one end by lands 807 and 808 and at its other end by lands 803 and 804. Posts 809, 811, 810 and 806 need not be flux conductive but the system's efficiency is increased when they are. Flux source 801 addresses the array through lens 802. Reflector 800 completes this optical assembly. Source 814 with its reflector 813 and lens 812 is illustrative of one of the other sources as previously described that could be used to address the array. It could also be replaced by a mirror. Film 805 can also be anti-reflection coated.

It should be understood that the foregoing relates only to preferred embodiments of the invention which have been by way of example only, and that it is intended to cover all changes and modifications of the examples herein chosen for the purposes of this disclosure, which do not constitute departures from the spirit and scope of the invention.

What is claimed is:

1. Apparatus for enhancing resolution of an image viewed by a viewer comprising:
a plurality of phase affecting light transmitting objects disposed in a stack in a light path of light energy defining the image, the image being externally produced and independent of said light transmitting objects, each object having a thickness and being spaced a distance apart from others of said objects, and further comprising a source of radiant energy separate from radiant energy of the image and not supplied by ambient light from the viewer's environment, for irradiating said objects, thereby creating standing waves in said objects which interfere with the light energy in the light path.

2. The apparatus recited in claim 1, wherein said objects comprise light transmitting plates.

3. The apparatus recited in claim 2 wherein said radiant energy source further irradiates spaces between said plates.

4. The apparatus recited in claim 3, wherein said source of radiant energy edge irradiates said plates.

5. The apparatus recited in claim 4, wherein said radiant energy source comprises a white light source.

6. The apparatus recited in claim 4, wherein said radiant energy source comprises a source producing at least one of ultraviolet and infrared radiant energy.

7. The apparatus recited in claim 4, wherein said radiant energy source comprises an incandescent lamp.

8. The apparatus recited in claim 4, where said radiant energy source comprises a fluorescent lamp.

9. The apparatus recited in claim 4, further comprising a plurality of radiant energy sources edge irradiating said plates in said stack, said plurality of radiant energy sources disposed on respective edges of said stack.

10. The apparatus recited in claim 9, further comprising a radiant energy source disposed along each edge of said stack.

11. The apparatus recited in claim 4, further comprising a lens for directing the radiant energy from said source into edges of said plates in said stack.

12. The apparatus recited in claim 11, wherein said lens is substantially coextensive with the edges of said plates in said stack.

13. The apparatus recited in claim 12, wherein said lens comprises first and second lens surfaces, the first surface for directing the radiant energy from said source into edges of said plates and the second surface for directing the radiant energy from said source into spaces between plates.

14. The apparatus recited in claim 11, wherein said lens comprises a plurality of lens surfaces disposed on a first side of said plates for directing radiant energy from a first radiant energy source to first selected ones of said plates, and a plurality of mirrors on an opposite side of said plates for directing radiant energy from said first source into first selected spaces between ones of said plates.

15. The apparatus recited in claim 14, further comprising a second lens on the side opposite the first side of said plates for directing radiant energy from a second radiant energy source to others of said plates other than said first selected ones of said plates, and a plurality of mirrors on said first side for directing radiant energy from said second source into others of said spaces other than said first selected spaces between ones of said plates.

16. The apparatus recited in claim 4, further comprising reflecting means disposed adjacent an edge of said stack opposite an edge on which the radiant energy source is disposed, for reflecting radiant energy from said source back into said stack.

17. The apparatus recited in claim 4, wherein said image is formed on an image display device.

18. The apparatus recited in claim 17, wherein said image display device comprises a television display device.

19. The apparatus recited in claim 17, wherein said image display device comprises a cathode ray tube.

20. The apparatus recited in claim 17, wherein said image display device comprises a liquid crystal display.

21. The apparatus recited in claim 20, further comprising means for directing said radiant energy from said source to said liquid crystal display.

22. The apparatus recited in claim 21, wherein said means for directing comprises a reflector disposed adjacent said liquid crystal display.

23. The apparatus recited in claim 22, wherein said reflector comprises a partially reflecting mirror for reflecting some radiant energy from said source to said liquid crystal display and for transmitting some energy to said plurality of plates.

24. The apparatus recited in claim 23, further comprising a further mirror for reflecting the radiant energy transmitted through said partially reflecting mirror to said plurality of plates.

25. The apparatus recited in claim 23, wherein said partially reflecting mirror comprises two coatings, one for reflecting radiant energy to a first side of said display and the other for reflecting radiant energy to a second side of said display.

26. The apparatus recited in claim 17, wherein said image display device comprises a movie screen.

27. The apparatus recited in claim 4, wherein said image is formed on photographic film for storage of said image.

28. The apparatus recited in claim 4, further comprising a plurality of stacks of phase affecting plates disposed in the light path.

29. The apparatus recited in claim 4, wherein said plates have a thickness of between 0.005 and 0.125 inches and are spaced at least one wavelength apart.

30. The apparatus recited in claim 3, wherein said radiant energy further irradiates said image.

31. The apparatus recited in claim 30, further comprising an additional source of radiant energy for irradiating the image.

32. The apparatus recited in claim 2, wherein said plates comprise plastic or glass.

33. The apparatus recited in claim 2, wherein said plates comprise a continuous sheet of light transmissive material folded back onto itself having at least one fold.

34. The apparatus recited in claim 2, wherein said plates are curved.

35. The apparatus recited in claim 2, further comprising at least one opaque strip disposed adjacent at least one edge of at least one plate for reducing the visibility of defect in the plate.

36. The apparatus recited in claim 1 wherein said apparatus provides said image with an apparent added sense of depth.

37. Apparatus for enhancing resolution of an image displayed on an image display device and viewed by a viewer comprising:

a plurality of phase affecting objects disposed in a light path travelled by light from the image from the display device, the image being externally produced and independent of said phase affecting objects, each phase affecting object retarding the phase of light from the image, each phase affecting object having a thickness and being spaced a distance apart from others of said objects; and a source of radiant energy separate from radiant energy of the image and not supplied by ambient light from the viewer's environment, for irradiating said phase affecting objects and for creating standing waves in said phase affecting objects that interfere with light energy from said image.

38. The apparatus recited in claim 37, wherein said phase affecting objects comprise substantially transparent plates disposed in a stacked arrangement.

39. The apparatus recited in claim 38, wherein said source of radiant energy comprises a radiant energy source for irradiating said plates in said stacked arrangement.

40. The apparatus recited in claim 38, wherein said radiant energy source additionally irradiates spaces between said plates.

41. The apparatus recited in claim 40, wherein said radiant energy source edge irradiates said plates.

42. The apparatus recited in claim 40, wherein said radiant energy additionally irradiates said image.

43. The apparatus recited in claim 38, wherein the display device comprises a cathode ray tube.

44. The apparatus recited in claim 38, wherein the display device comprises a liquid crystal display.

45. The apparatus recited in claim 38, wherein the display device comprises a movie screen.

46. The apparatus recited in claim 38, wherein said source of raidant comprises a fluorescent lamp.

47. The apparatus recited in claim 38, wherein said plates have a thickness between 0.005 and 0.125 inch and are spaced at least one wavelength apart.

48. The apparatus recited in claim 38, wherein said plates are curved.

49. The apparatus recited in claim 37, wherein said apparatus provides said image with an apparent added sense of depth.

50. Apparatus for enhancing resolution of an image to be stored on a storage device and to be viewed by a viewer comprising:

a plurality of phase affecting objects disposed in a light path travelled by light comprising the image to be stored on the storage device, the image being externally produced and independent of said light transmitting objects, each phase affecting object retarding the phase of light comprising the image, each phase affecting object having a thickness and being spaced a distance apart from others of said objects; and a source of radiant energy separate from radiant energy of the image and not supplied by ambient light from the viewer's environment, for irradiating said phase affecting object and for creating standing waves in said phase affecting objects that interfere with light energy comprising the image to be stored.

51. The apparatus recited in claim 50, wherein said phase affecting objects comprise substantially transparent plates disposed in a stacked arrangement.

52. The apparatus recited in claim 51, wherein said source of radiant energy comprises a radiant energy source for irradiating said plates in said stacked arrangement.

53. The apparatus recited in claim 52, wherein said radiant energy source additionally irradiates spaces between said plates.

54. The apparatus recited in claim 52, wherein said radiant energy source edge irradiates said plates.

55. The apparatus recited in claim 52, wherein said source of radiant energy comprises a fluorescent lamp.

56. The apparatus recited in claim 51, wherein said plates have a thickness between 0.005 and 0.125 inch and are spaced at least one wavelength apart.

57. The apparatus recited in claim 50, wherein said storage device comprises photographic film.

58. The apparatus recited in claim 50, wherein said apparatus provides said image to be stored so that the image has an apparent added sense of depth.

59. A method for enhancing resolution of an image viewed by a viewer comprising:

providing light energy in a light path defining the image;

transmitting said light energy through a plurality of phase affecting light transmitting objects disposed in the light path in a stack, the image being externally produced and independent of said light transmitting objects, each object having a thickness and being spaced a distance apart from others of said objects; and further comprising irradiating said objects with radiant energy generated by a source separate from radiant energy of the image and not supplied by ambient light from the viewer's environment, thereby creating standing waves in said objects which interfere with the light energy in the light path.

60. The method recited in claim 59 further comprising the step of irradiating spaces between the objects with the radiant energy.

61. The method recited in claim 60, wherein said objects are plates and said step of irradiating comprises edge irradiating said plates.

62. The method recited in claim 61, wherein said step of irradiating comprises irradiating with a white light source.

63. The method recited in claim 61, wherein said step of irradiating comprises irradiating with a radiant energy source producing at least one of ultraviolet and infrared radiant energy.

64. The method recited in claim 61, wherein said step of irradiating comprises irradiating with an incandescent lamp.

65. The method recited in claim 61, wherein said step of irradiating comprises irradiating with a fluorescent lamp.

66. The method recited in claim 61, wherein said step of irradiating comprises irradiating with a plurality of radiant energy sources edge irradiating said plates in said stack, said plurality of radiant energy sources disposed on respective edges of said stack.

67. The method recited in claim 66, wherein said step of irradiating comprises irradiating with a radiant energy source disposed along each edge of said stack.

68. The method recited in claim 61, further comprising directing the radiant energy with a lens into edges of said plates in said stack.

69. The method recited in claim 61, further comprising reflecting radiant energy from a radiant energy source back into said stack on an edge of said stack opposite an edge on which the radiant energy source is disposed.

70. The method recited in claim 61, further comprising forming the image on an image display device.

71. The method recited in claim 70, further comprising forming the image on a television display device.

72. The method recited in claim 70, further comprising forming the image on a cathode ray tube.

73. The method recited in claim 70, further comprising forming the image on a liquid crystal display.

74. The method recited in claim 73, further comprising directing said radiant energy to said liquid crystal display.

75. The method recited in claim 74, wherein said step of directing comprises directing with a reflector disposed adjacent said liquid crystal display.

76. The method recited in claim 75, wherein said step of directing comprises partially reflecting some radiant energy to said liquid crystal display and transmitting some radiant energy to said plurality of plates.

77. The method recited in claim 76, further comprising reflecting the transmitted radiant energy to said plurality of plates.

78. The method recited in claim 76, wherein said step of reflecting comprises reflecting some radiant energy to a first side of said display and some radiant energy to a second side of said display.

79. The method recited in claim 70, further comprising forming the image on photographic film for storage of said image.

80. The method recited in claim 70, further comprising forming the image on a movie screen.

81. The method recited in claim 61, wherein said step of transmitting comprises transmitting the light energy through at least one additional stack of phase affecting plates disposed in the light path.

82. The method recited in claim 61, further comprising providing said plates with a thickness of between 0.005 and 0.125 inches and spacing said plates at least one wavelength apart.

83. The method recited in claim 61, wherein said step of transmitting comprises transmitting through plates comprising plastic or glass.

84. The method recited in claim 61, wherein said light energy is transmitted through curved plates.

85. The method recited in claim 60, further comprising irradiating the image with the radiant energy.

86. The method recited in claim 59, wherein said method provides said image with an apparent added sense of depth.

87. Apparatus for enhancing resolution of an image viewed by a viewer comprising:
at least one phase affecting light transmitting object disposed in a light path of light energy defining the image, the image being externally produced and independent of said light-transmitting object, the object having a thickness, and further comprising a source of radiant energy separate from radiant energy of the image and not supplied by ambient light from the viewer's environment, for irradiating said object, thereby creating standing waves in said object which interfere with the light energy in the light path.

88. The apparatus recited in claim 87, wherein said object comprises a plate and said source of radiant energy edge irradiates said plate.

89. A method for enhancing resolution of an image viewed by a viewer comprising:
providing light energy in a light path defining the image;
transmitting said light energy through at least one phase affecting light transmitting object disposed in the light path, the image being externally produced and independent of said light transmitting object, the object having a thickness; and
further comprising irradiating said object with radiant energy from a source separate from radiant energy of the image and not supplied by ambient light from the viewer's environment, thereby creating standing waves in said object which interfere with the light energy in the light path.

90. The method recited in claim 89, wherein said object comprises a plate and said step of irradiating comprises edge irradiating said plate.

91. Apparatus for enhancing resolution of an image viewed by a viewer comprising:
a plurality of phase affecting light transmitting objects disposed in a stack in a light path of light energy defining the image, the light energy having a frequency range, the image being externally produced and independent of said light-transmitting objects, each object having a thickness and being spaced a distance apart from others of said objects, each object being non-frequency selective in the frequency range of the light energy, and further comprising a source of radiant energy separate from radiant energy of the image and not supplied by ambient light from the viewer's environment, for irradiating said objects, thereby creating standing waves in said objects which interfere with the light energy in the light path.

92. Apparatus for enhancing resolution of an image viewed by a viewer and generated by an image generating surface, the apparatus comprising:
a plurality of phase affecting light transmitting objects disposed in a stack in a light path of light energy defining the image, the light energy having a frequency range, the image being externally produced and independent of said light-transmitting objects, there being no fixed relationship between any feature of the image on the image generating surface and a point on any of the objects, each object having a thickness and being spaced a distance apart from others of said objects, each object being non-frequency selective in the frequency range of the light energy, and further comprising a source of radiant energy separate from radiant energy of the image and not supplied by ambient light from the viewer's environment, for irradiating said objects, thereby creating standing waves in said objects which interfere with the light energy in the light path.

* * * * *